United States Patent [19]

Arnold et al.

[11] 4,141,390
[45] Feb. 27, 1979

[54] OPTICAL ELECTRONIC SEED SOWING SYSTEM

[75] Inventors: Eugene W. Arnold, Centralia; Gregory K. Brock, Auburn; David G. Halley, Renton, all of Wash.

[73] Assignee: Weyerhaeuser Company, Tacoma, Wash.

[21] Appl. No.: 859,116

[22] Filed: Dec. 9, 1977

[51] Int. Cl.² ............................................. B65B 1/04
[52] U.S. Cl. ...................................... 141/9; 141/284; 47/1 R; 53/470; 250/560; 356/442
[58] Field of Search ....................... 141/1-12, 141/35, 36, 100-107, 125, 129-191, 250-284, 324, 367; 198/34, 76, 184; 53/61, 62, 36, 160, 178, 180, 239; 111/1; 47/1; 250/560; 209/111.7; 356/102

[56] References Cited

U.S. PATENT DOCUMENTS

| 3,327,850 | 6/1967 | Simmons | 250/560 |
| 3,349,905 | 10/1967 | Crawford | 250/560 |
| 3,515,487 | 6/1970 | Hatcher et al. | 250/560 |
| 4,010,778 | 3/1977 | Aggen | 141/9 |

*Primary Examiner*—Houston S. Bell, Jr.
*Attorney, Agent, or Firm*—Owen, Wickersham & Erickson

[57] ABSTRACT

A seed sowing system and method employing photoelectric sensing equipment to detect singulated seeds and to actuate stepping equipment that ensures separate delivery of seeds to individual planting loci. The seed may come to the sensing equipment via a singulator and a low-pressure air stream. The photoelectric sensor is actuated each time the air stream carries a seed past a certain locus, and the sensor, in turn, actuates a cyclic stepping device by which each seed in a cycle is delivered into a different delivery tube and from there is deposited in a separate receptacle of a shutter. The stepping device is interconnected electronically with shutter indexing mechanism, by which the shutter is advanced and reindexed after each row of its seed-receiving openings has received its seeds, which may come from a single cycle or from a plurality of cycles. When the shutter is filled, the shutter moves over a planting location, beneath which may be a flat or a rack of seed-receiving capsules, held in a receiving position below a distributing assembly. The shutter releases the seeds from the shutter into a distributing assembly, from which they fall into the flat or the capsules. The system is very rapid and has the advantage of being able to handle a wide variety of seed types of different shapes, sizes, and weights.

76 Claims, 17 Drawing Figures

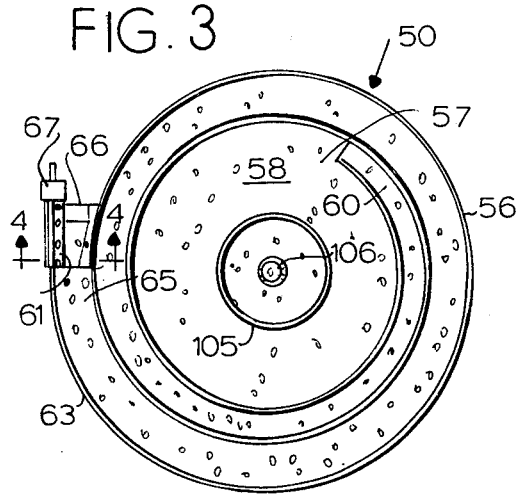
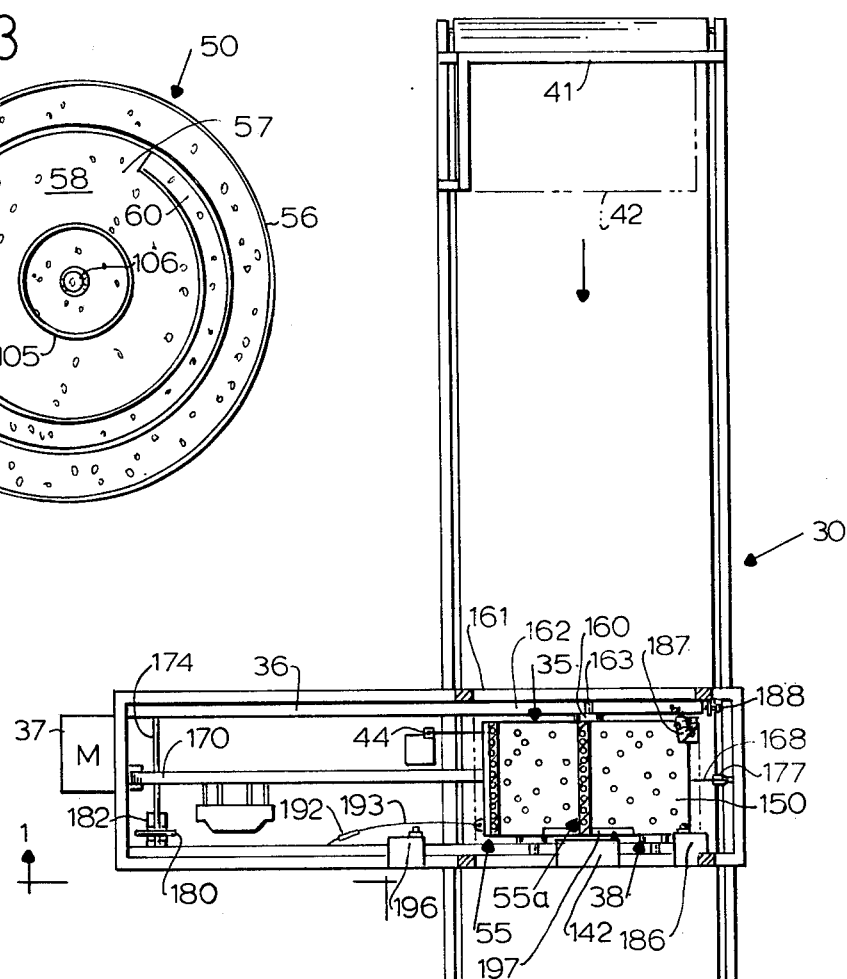
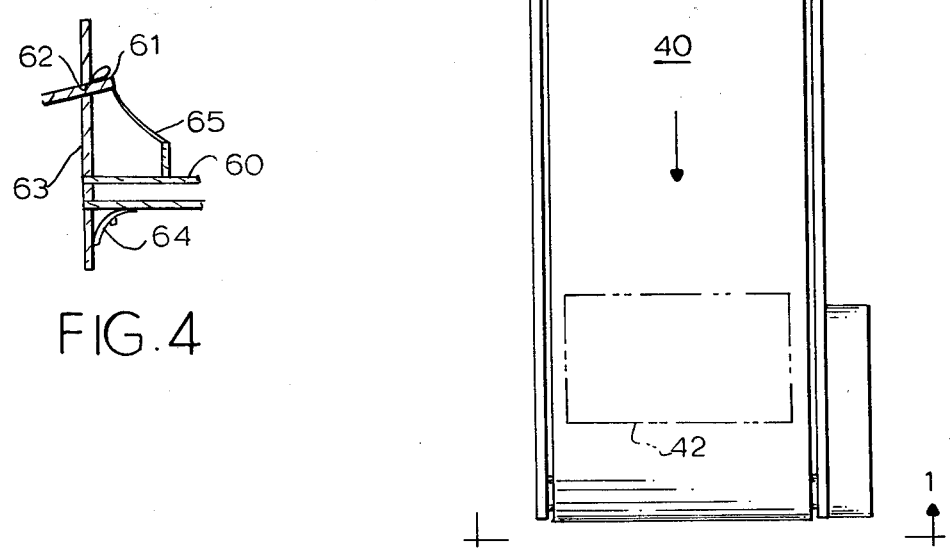

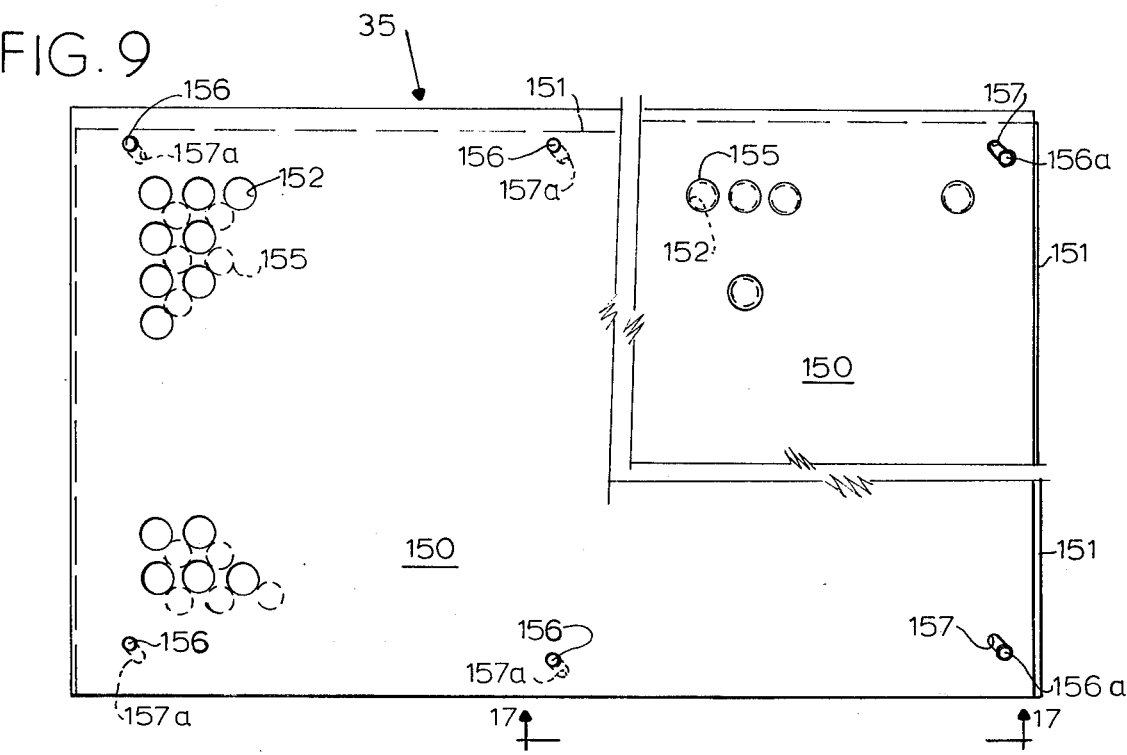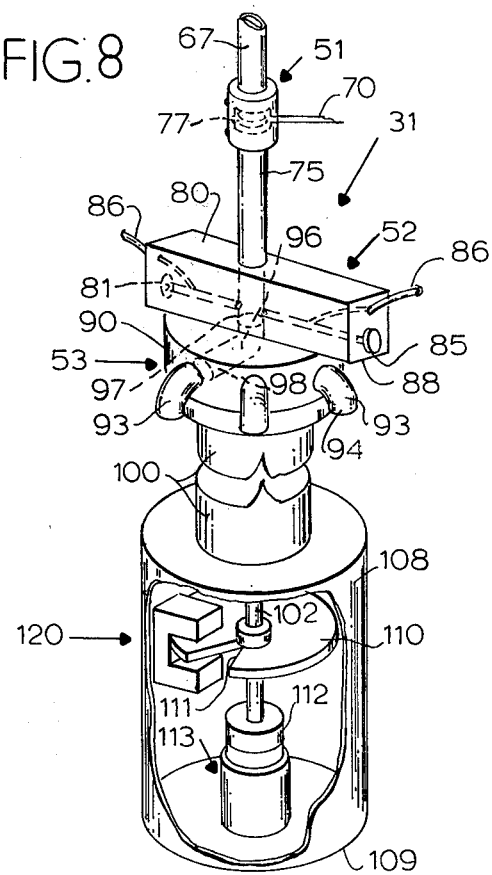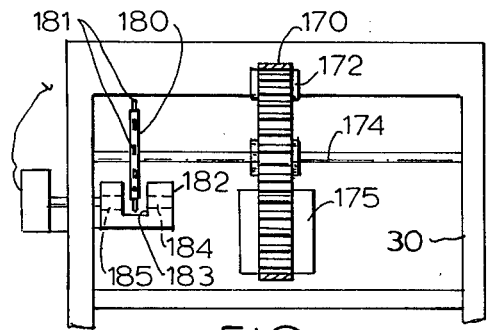

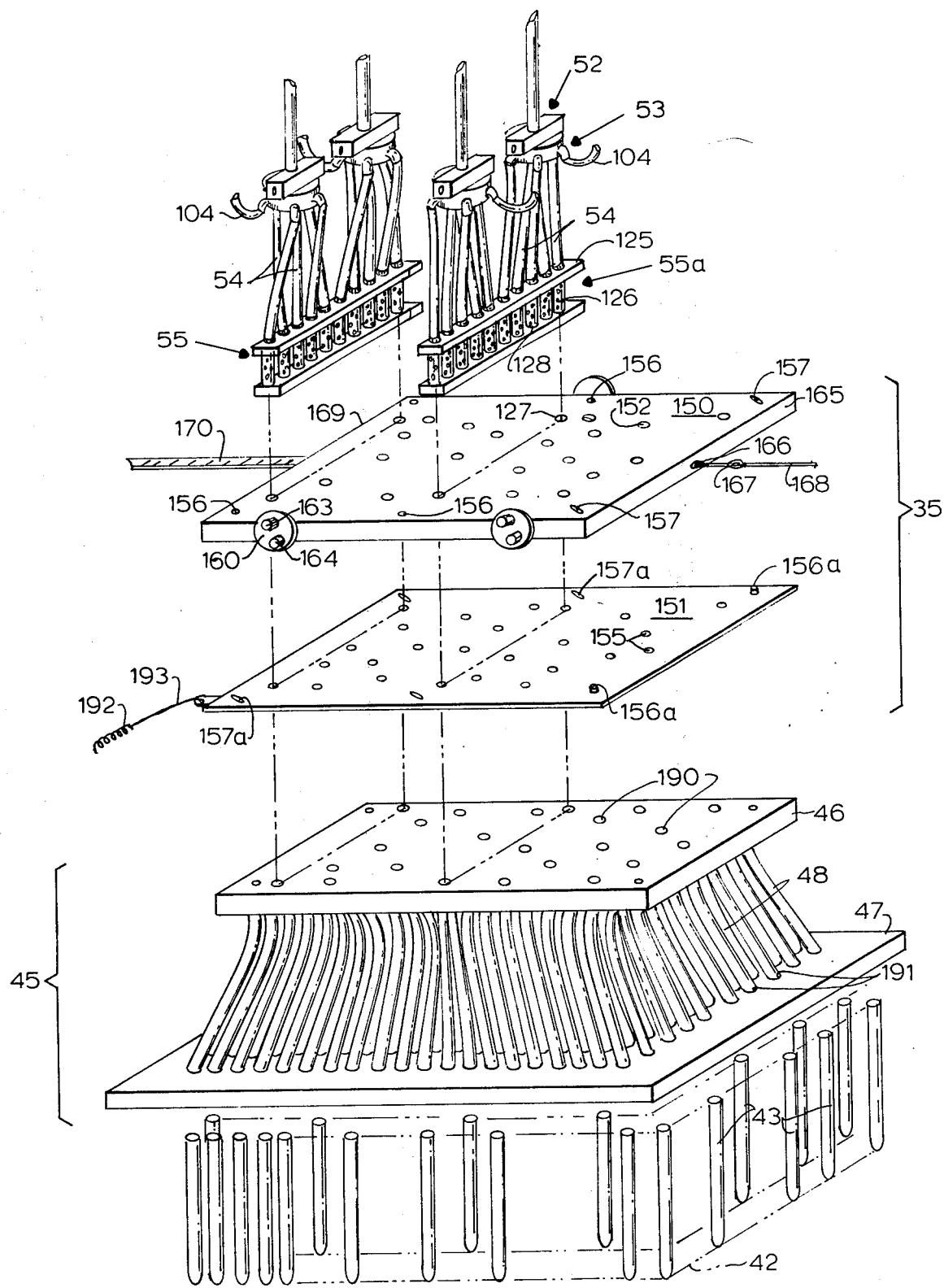

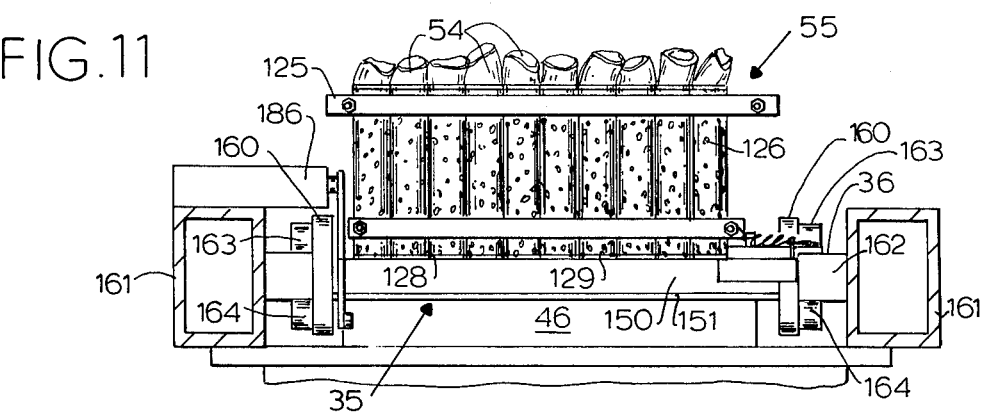
FIG. 11
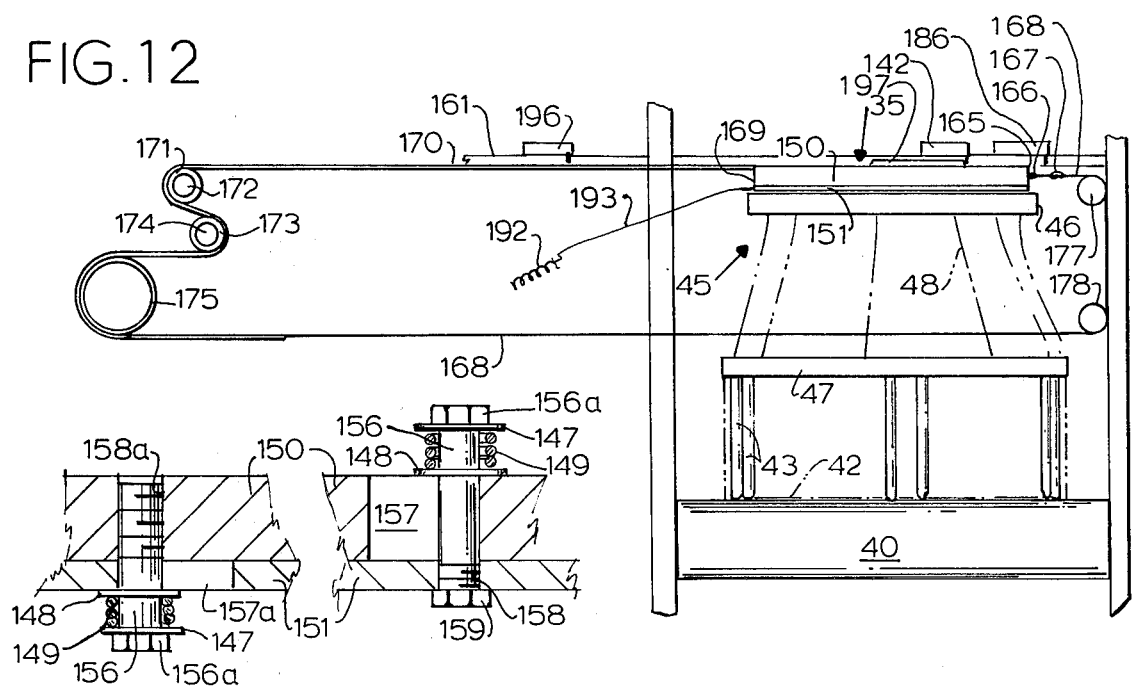
FIG. 12
FIG. 17
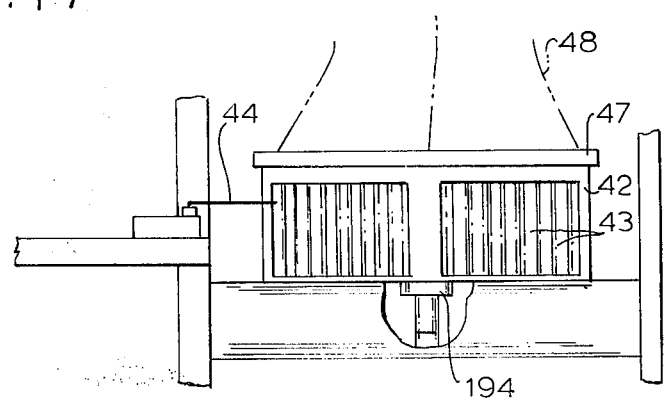
FIG. 15

OPTICAL ELECTRONIC SEED SOWING SYSTEM

BACKGROUND OF THE INVENTION

This invention relates to improvements in handling seeds and in sowing prepared flats, plug seedling trays, and the like. It has both apparatus and method aspects.

Flats of various sizes may contain various growing media, such as soil, mixtures of sand and peat moss, plastic foam, synthetic growing medium, and so on. For large quantity production of seedlings, there may be several hundred seeds per flat sown at precisely spaced intervals and there may be thousands of flats to be sown. For purposes of this invention the term "flat" is intended to include not only wooden or planter flat boxes filled with growing medium, but also a self-supporting slab of synthetic growing medium such as polyurethane foam, which may have prepared properly spaced-apart indentations for reception of seeds.

Plug seedings are grown in containers which vary considerably in size, partly depending on the plant variety. Individual plastic growing containers or capsules, one for each seedling, are normally assembled into clusters, typically of from fifty to about two hundred. These clusters are typically held in a simple rack of some sort so that the center-to-center spacing and geometry are fixed for a given container type. After the seedling capsules are filled to a desired level with a growing mixture of soil, they pass to a seeding station for reception of seeds, one or more per container, after which the seeds are suitably covered, as with soil or mulch.

Heretofore, many different mechanisms for placing the seeds into flats or capsules have been used, but none has been fully satisfactory. One common seeding device has employed a plate containing a number of shallow pockets having the same configuration and spacing as the rack of capsules or the desired spacing in the flat. The pockets have had a trapdoor type of arrangement at their bottom surface. When the seeding plate has been located properly in relation to the flat or capsules, the trapdoors have been opened and the seeds have fallen by gravity into the flat or capsules beneath the plate. The seed transfer has been acceptable, but there have been problems in getting the proper number of seeds (whether one or more) into each pocket of the seeding plate with sufficient accuracy and speed. Various singulating and distribution devices have been used, but none of these has proved entirely satisfactory to date. The present invention is directed to that problem, as well as others.

Manual sowing or seed distribution has been unable to solve that problem because manual sowing is very slow, is labor intensive, and is subject to human error.

Traditional mechanical and vacuum sowers have possessed major design weaknesses. They have universally required adjustments to compensate for seed shape and size, both types being unduly sensitive to seed geometry. Flat or pointed seeds have been difficult or impossible to sow accurately with vacuum sowers, and inaccuracy has resulted in skipped capsules or in multiples — two or more seeds in the same locus or pot, necessitating later removal of some seedlings by hand. Devices such as post-pickup shakers and air brushes have been tried and did somewhat reduce the number of multiples, but they did not solve the problem. Mechanical sowers have had similar trouble with seed geometry, particularly with seeds having a flat profile; such seeds have often been physically damaged by a mechanical sower and their germination potential degraded. Small seeds, e.g., those with a diameter less than 2 mm, have caused problems for both mechanical and vacuum sowers. Although it has been possible to improve vacuum sower accuracy by pelletizing small seeds to approximate a spherical shape before sowing, pelletizing has been expensive, and has often had the effect of reducing the percentage of germination.

In our tests, those available prior-art sowers all sowed an excessive number of blanks, usually because small pieces of chaff from the seeds plugged nozzle orifices. Some models cycled low-pressure air behind the nozzles to blow off the chaff, but even though this eliminated some of the chaff, it did not completely solve the problem, for flat-sided chaff still wedged in orifices so tightly that air pressure alone would not remove it.

In summary, although various standard off-the-shelf vacuum and mechanical sowers have been available, none has been found adequate for high-speed accurate sowing.

One object of this invention is to provide a system for positively identifying and sowing each seed as a separate individual, thereby reducing the dependence of sowing accuracy on seed geometry.

Another object is to enable extremely rapid individual sowing to be carried on with very high accuracy.

Another object is to enable multiple sowing when desired and to render this accurate so that the same number of seeds is sowed each time in each capsule or pot or each flat location.

Another object is to provide a versatile sower able to sow many different kinds, types, sizes, shapes, and weights of seeds.

SUMMARY OF THE INVENTION

The system of this invention distributes seeds or other small, light objects, into respective containers or locations according to a predetermined program. The program specifies the number of objects to be placed in each container or each location.

The system includes a feed mechanism with several singulators, several radially symmetrical multiport distributor assemblies, one or more photodetector assemblies, an electronic control logic subsystem, and electromechanical servomechanisms to operate the distributor and a shutter indexing system.

Each seed singulator provides a singulated seed stream, each seed of which is inducted into an air stream. A photosensitive seed-detector in each air stream is actuated each time a seed passes a predetermined point on its way to a seed distributor assembly. This assembly comprises a single inlet from its air stream, a series of outlets, a rotatable distributor member for connecting the inlet in sequence to each outlet, and a stepping motor for moving said distributor from outlet to outlet in a cycle. One outlet is utilized as a concluding or "home" position in order to actuate subsequent cycling mechanism, and allows the seed or seeds passing into this outlet to be recycled to the singulator during the time when the shutter is translated. The stepping motor is actuated by the photoelectric seed detector via a control and time-delay circuit, for moving the stepping motor one step each time immediately after a seed has passed into an outlet, there being just enough delay after detection of the seed to enable its passage from the detector into that outlet. A home-position sensor is actuated each time the distributor member reaches its home position, thereby concluding a cycle.

A movable shutter tray has a series of rows of seed-receiving through-openings, each opening being fed seeds one at a time by one of a series of conduits, one conduit leading from each distributor outlet. Here all the seeds for all distributors are dispensed to the shutter tray. A stepwise translating means is actuated by the home-position sensors for moving the shutter tray one row forward each time *all* home positions of *all* the stepping motors have been reached. A shutter plate, located below the shutter tray, has a series of openings in rows corresponding exactly in number and position of seed-receiving through openings to the openings in the shutter tray, but the shutter plate's openings are normally offset from the shutter tray's openings and imperforate portions of the shutter plate normally underlie the shutter tray's openings and hold up the seeds.

A conveyor is used for conveying a flat or a rack of planting receptacles or capsules in groups corresponding in number and spacing to the shutter tray and shutter plate openings. A limit switch stops the conveyor each time a flat or rack of planting capsules reaches a planting station. In this position the flat or rack underlies a lower distributor plate having through openings corresponding to the desired spacing for the flat or with which the capsules are then aligned. The openings through the lower distributor plate are joined by separate conduits to an upper distributor plate which has openings spaced just as in the shutter, usually closer together than the openings in the lower distributor plate.

When the shutter tray's openings are all filled with the desired number of seeds per opening, typically but not necessarily one per opening, the shutter tray and the shutter plate are moved together to the planting station immediately above the upper distributor plate, each shutter tray opening then overlying an opening of the upper plate. The shutter plate is then quickly moved diagonally so that its openings are aligned with those of the shutter tray, and all the seeds fall down via the upper distributor plate, the individual conduits, and the lower distributor plate into the flat or planting capsules. The shutter plate and shutter tray are then returned together to their starting position, and the shutter plate is returned to its normal position beneath the shutter tray, where it blocks the shutter tray's openings. As soon as the shutter has returned to its starting position, the conveyor moves the flat or rack of capsules away, and a new flat or rack is thereupon moved to the planting station.

Other objects, features, and operation of the invention will appear from the following description of a preferred embodiment thereof.

BRIEF DESCRIPTION OF THE DRAWINGS

In the drawings:

FIG. 2 is a view in horizontal section of the apparatus of FIG. 1, taken along the line 2—2 in FIG. 1.

FIG. 3 is a plan view of a seed singulator suitable for use in the invention.

FIG. 4 is an enlarged view in section taken along the line 4—4 in FIG. 3.

FIG. 8 is a partially exploded isometric view of one seed-sowing head of the type shown in FIGS. 5 and 6.

FIG. 9 is a plan view of the shutter tray-shutter plate assembly, with one portion indicating in broken lines the position of the shutter plate openings relative to those of the shutter tray and with another portion broken away, showing the openings of both tray and plate in alignment.

FIG. 10 is an isometric partially exploded view of the shutter tray and shutter plate with the structure by which the shutter receives seeds, and the distributor plate assembly.

FIG. 11 is a view in vertical section of the shutter and carriage assembly.

FIG. 12 is a view in elevation, somewhat diagrammatic, of the shutter assembly and the transporting and stepping mechanism therefor.

FIG. 13 is a view in elevation of the timing stepping shaft of FIG. 12.

FIG. 14 is a plan view of the tripping mechanism for moving the shutter plate relatively to the shutter tray.

FIG. 15 is a fragmentary view in elevation of the planting position, showing a limit switch for the flat or rack of capsule containers.

FIG. 17 is an enlarged view of the attachment of the shutter plate to the shutter tray to enable relative offset and alignment at appropriate times, the view being taken along the line 17—17 in FIG. 9 and partially broken away.

DESCRIPTION OF A PREFERRED EMBODIMENT

Figure 1:
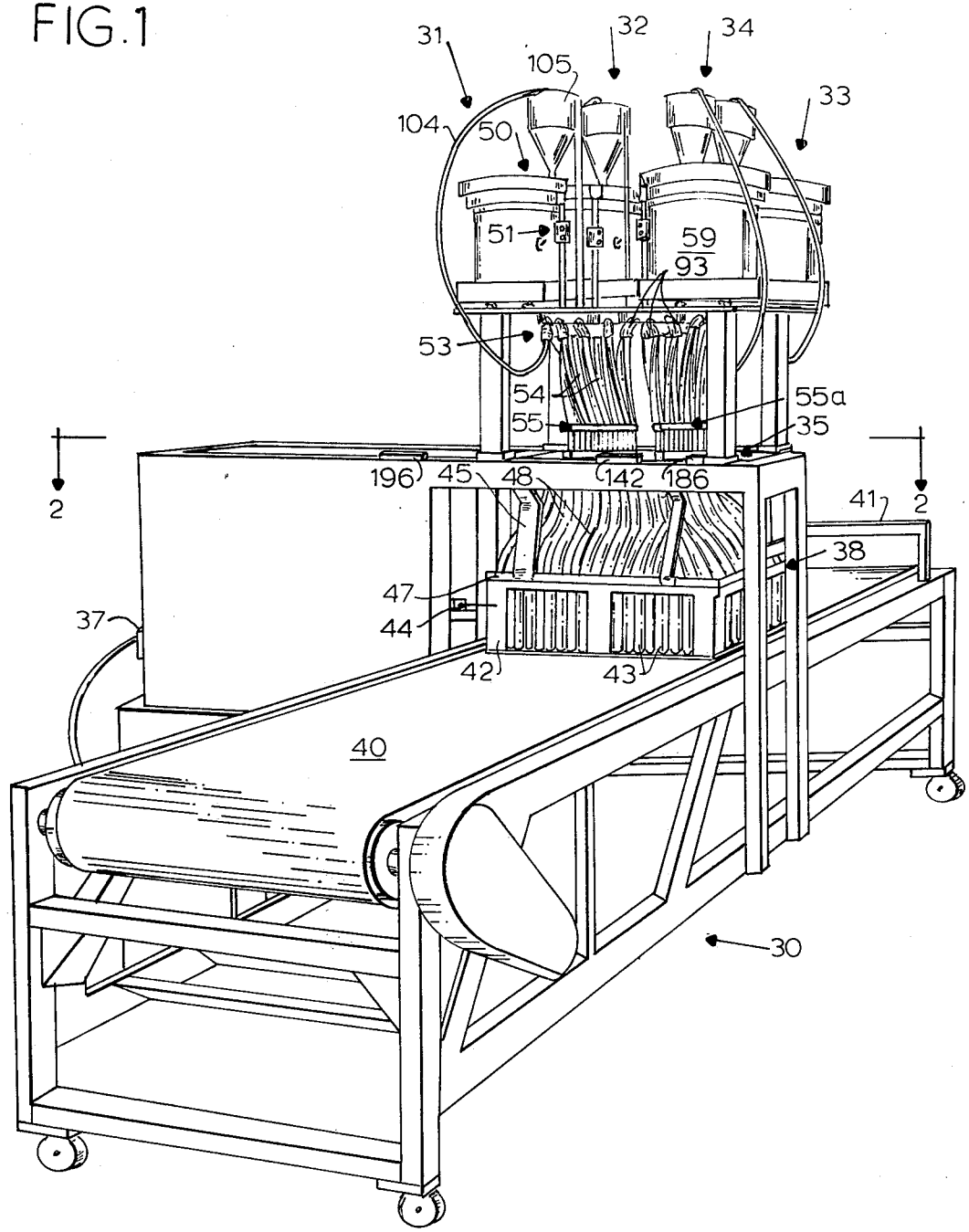
FIG. 1 is a view in perspective of a seed-sowing apparatus for sowing seeds into flats or planting capsules and embodying the principles of the invention.

General Description (FIGS. 1 and 2):

FIGS. 1 and 2 show the general layout of an apparatus embodying the principles of the invention. A main frame 30 supports a plurality (for example, four) of seed-feeding assemblies 31, 32, 33, and 34 all feeding a movable shutter 35. Each seed-feeding assembly singulates the seeds fed to it and passes them by an optical-electronic detection zone to a distributor which feeds a plurality (e.g., five) of channels, all providing seeds to the shutter 35, which has a series of rows of seed-receiving openings. The shutter 35 is supported for stepped translating movement along a horizontal guideway 36, being driven by a motor 37, one row for each step, so that at each step the seed-feeding assemblies feed a different row. When the shutter 35 has received its full quota of seeds, it is moved to a planting station 38.

The main frame 30 also supports a conveyor 40 having an aligning device 41 where are placed, at intervals, flats or racks 42. Each rack 42 may hold a cluster of seedling capsules 43 containing soil, or the flat may be provided with seed receptacles or just be designed for certain spacing. The conveyor 40 moves each flat or rack 42 from the aligning device 41 to the planting station 38, where the flat or rack 42 engages a limit switch 44 that stops the conveyor 40 with the flat or rack 42 at a location properly indexed in relation to the planting station 38, all before the arrival there of the shutter 35. At the planting station 38 is a stationary distributor assembly 45 (See also FIG. 10), comprising an upper distributor plate 46 with openings therethrough spaced exactly as in the shutter 35, a lower plate 47 with openings therethrough spaced exactly as the capsules 43 are spaced in the rack 42 (or to a desired spacing in a flat), and a series of conduits 48, each conduit 48 connecting one opening of the upper plate 46 with one opening in the lower plate 46. When the shutter 35 arrives at the planting station 38, its seeds are released and fall down via the plate 46, conduits 48, and plate 47 into the flat or into the capsules 43. The shutter 35 then returns for another charge of seeds, and when the shutter 35 reaches its starting position, the conveyor 40 is actuated to carry the planted flat or rack 42 away and bring another flat or rack 42 to the planting station 38.

Figure 5:
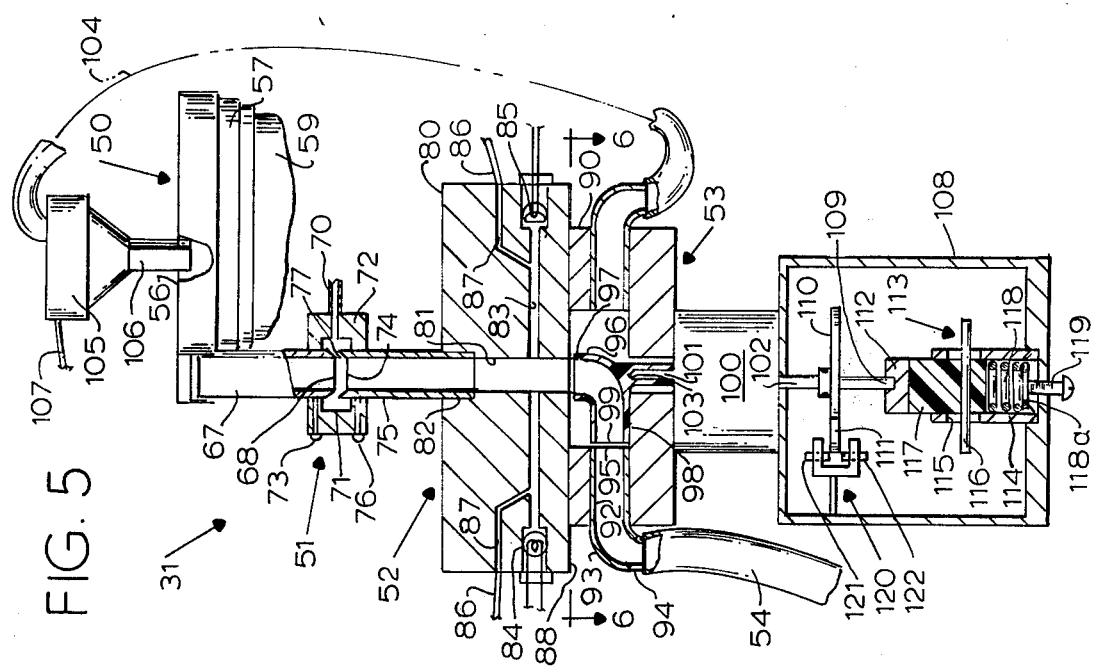
FIG. 5 is a view in elevation and in section of one seed-sowing head assembly, with some portions broken off.

The seed-feeding assemblies 31, 32, 33, and 34 (FIGS. 1, 5, and 8)

Each seed-feeding assembly 31, 32, 33, and 34 comprises four parts: (a) a vibratory feeder 50, (b) an inductor 51, (c) a photosensitive seed detector 52, (d) a valving device or rotary seed distributor 53, (e) a series of distributor conduits 54, and (f) a seed transfer assembly 55, where the seeds are transferred to the shutter 35. FIGS. 3–6 and 8 show one seed-feeding assembly 31, and the other seed-feeding assemblies 32, 33, and 34 are substantially identical to it. There may, of course, be only one seed-feeding assembly or there may be more than four or fewer than four seed-feeding assemblies. By way of example, a rack 42 of 200 capsules 43 is shown, and the shutter 35 has twenty rows of ten receptacles each. But the invention is applicable to a flat for receiving, for example, 400 seeds, each singulated on 400 seed-planting locations. Then, the shutter 35 might have twenty rows of twenty receptacles each and there might be eight seed-feeding assemblies, or there might be only four but distributing seeds in tens instead of in fives, as explained below.

The vibratory feeders 50 (FIGS. 1 and 3–5)

Each vibratory feeder 50 may include a standard spiral vibratory machine parts feeder 56 comprising a bowl 57 with a floor 58 beneath which is a suitable vibrator in a housing 59. The vibrator causes seeds to travel upwardly along a generally spiral peripheral path 60, usually wide enough to receive several seeds of typical size. However, the feeder 56 is modified by providing on it an adjustable-width outlet alley 61, preferably set to a width of one seed and inclined slightly outwardly to retain its one seed per width. The alley 61 is a shaped metal strip inserted through an opening 62 in an outside wall 63, with a spring 64 attached to the outer surface of the wall 63 to hold the alley 61 in any position to which it is set. Below the alley 61, the path is cut away on a steep inward slope 65 to return most seeds to a lower portion of the path 62. The alley 61 singulates the seed output over an edge 66, where the seeds drop one by one into a vertical tube 67.

By way of example, the input power for the vibrator may be nonrectified to give the bowl 57 a 120 Hz frequency (with 60-cycle current). Output speed can be adjusted by adjusting the amplitude of vibration to adjust the number of seeds per second; for example, they may be set to average about 5 to 12 seeds per second, giving a mean time of about 100 ms to about 200 ms between seeds. The actual time between seeds may be a normal distribution of which the shortest time between seeds is greater than the cycle time of the stepper motor 100; for example the time between seeds may be between about 35 ms to about 250 ms. Differences in the location of the center of gravity of individual seeds and differences of acceleration rates, as the seeds are drawn into the inductor 51, affect the time between seeds. The seed spacing is basically set at the outlet 66 from the vibrator feeder 50.

Seeds that are sticky, e.g., that have pitch on their surface, should be treated, as with talc, before placing them in the vibrator bowl 57.

The inductors 51 (FIGS. 5 and 8)

Seeds drop from the vibratory feeder 50 via the tube 67 to the inductor 51; the tube 67 ends in a shaped lower edge 68. In each inductor 51 each seed is accelerated by air drawn through a low pressure (e.g., 70 to 100 kilopascals) inductor tube 70 into an annular passage 71 enclosed by an inductor housing 72, held in place on the tube 67 by a set screw 73. Inside this housing 72 is the tube end 68, which is preferably spaced above an upper end 74 of a standoff tube 75, to which the housing is secured by a set screw 76. Preferably, the tube ends 68 and 74 are tapered as shown in FIG. 5. The spacing between the ends 68 and 74 defines an inductor orifice 77, which is adjustable by the set screws 73 and 76 to maximize air flow.

Seed velocity is not critical to sower performance as long as at least a minimum velocity is maintained sufficient to insure reliable seed transport to the shutter 35. The time between seeds is a function of the seed flow rate from the vibratory feeder 50, not of seed velocity.

The purpose of the inductor 51 is to induce the seeds into an air stream capable of transporting them without damage, at low velocity, through a path where, as will be seen, gravity alone would not suffice. The air stream has a velocity low enough to avoid damage to the seeds. For example, it may be one or two meters per second.

The optical-electronic detector 52 (FIGS. 5 and 8)

The seeds traveling from the inductor 51 pass via the tube 75 through the photodetector 52. Each photodetector 52 has a housing 80 with a vertical passage 81 the same diameter as the inner diameter of the tube 75. An upper portion 82 provides a socket for snug reception of the tube 75. Below the lower end of the tube 75, a light passage 83, preferably rectangular in order to cover the entire width of the passage 81, is machined transversely through the housing 80, extending in line with a diametral line across the passage 81. A light source, such as an incandescent bulb 84 is at one end of the light passage 83 and is arranged to produce a substantially collimated light curtain. The housing 80 may be made from aluminum, or the internal surface of the passage 83 may be painted silver or actually silvered, to maintain maximum light level. At the other end of the light passage 83 is a light detector 85. Small nylon tubes 86 feed low velocity air to inlet passages 87 that flow into the passage 83 near both its ends to flow into the vertical passage 83 and prevent seeds from bouncing into the light passage 83 and accidentally blocking the light path. The air inlet tubes 86 and 87 also provide an air stream tending to carry away dust and debris from the light source 84 and the light sensor 85.

Changes in light levels may be detected by any suitable photosensitive device 85, such as an NPN phototransistor mounted in the passage 83 at the end opposite to the light source 84. As will be explained below, signals from the transistor 85, generated when seeds flowing in the air stream past the passage 83 momentarily and partially block off the light curtain, are a-c coupled to the input of the amplifier 130 (see below), and the static d-c components are blocked. This minimizes sensitivity problems associated with changing light-source, intensity, different seed sizes, and debris buildup on the surfaces of the light source 84 or sensor 85.

As each seed interrupts the light curtain, a corresponding signal is used to drive the rotary distributor 53, as will be explained. Successive seeds are used to step the distributor 53 until the correct number of seeds have been distributed to the shutter 35.

The rotary distributor 53

Figure 6:
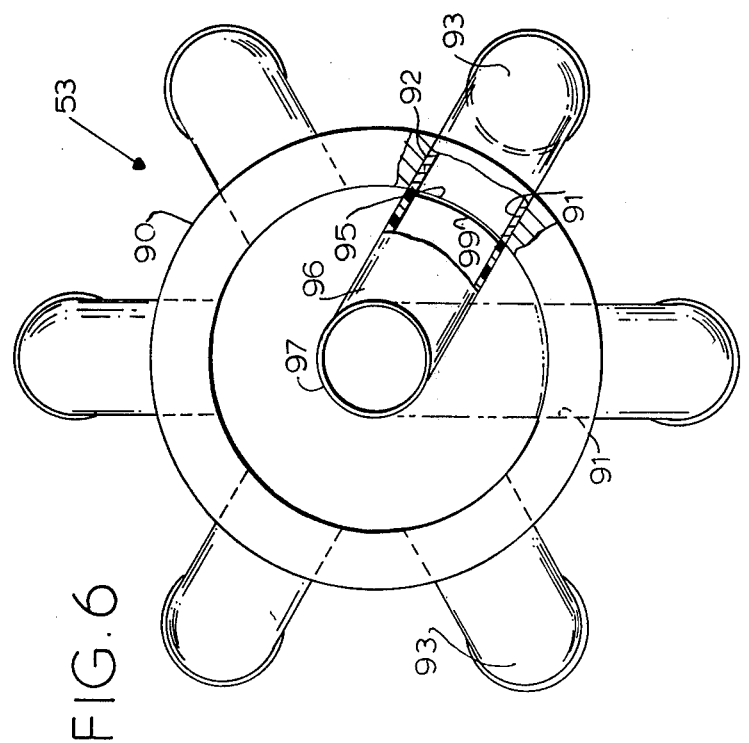
FIG. 6 is a plan view of the rotary distributor portion of the head of FIG. 5, taken along the line 6—6 in FIG. 5. One position of the distributing elbow is shown in solid lines; in another position it is shown in broken lines.

(FIGS. 5, 6, and 8)

The singulated single seeds are to be cyclically distributed to the series of conduits 54 by the rotary distributor 53. Each rotary distributor 53 comprises a hollow cylindrical ring 90 that lies just below the lower edge 88 of the photodetector housing 80. The ring has a series of circumferentially spaced radial openings 91. The number of these openings 91 is related to the steps of the stepping motor 100 in a cycle thereof; for an example, six openings 91 are shown. There could be eight or twelve or sixteen, and so on. In each opening 91 is set a horizontal arm 92 of a stationary elbow 93 having a vertical arm 94, each vertical arm 94 (except one) being connected to a conduit 54. The stationary elbows 93 are identical, and their ends 95 of the horizontal arms 92 lie flush with the inner surface of the ring 90, the ends 95 preferably being shaped along the arc of the ring's inner surface.

A rotating distributor elbow 96 is mounted rotatably inside the ring 90 and has a vertical inlet arm 97 in accurate alignment at all times with the vertical passage 81 and a horizontal outlet arm 98 whose end 99 wipes or nearly wipes the inlet ends of the arms 93 and the inner surface of the ring 90, the end 99 being arcuately shaped, preferably for that purpose. The distributing elbow 96 is preferably made very light and of nearly eggshell thickness, to minimize rotational inertia, which adversely affects stepping accuracy and speed.

The power for rotating the distributor elbow 96 from one stationary elbow to the next is provided by a conventional stepping motor 100 having an upper output shaft 101 and a lower output shaft 102. The lightweight distributor elbow 96 has a depending receptacle 103 that receives and is preferably adhesively secured to the upper output shaft 101. The stepping motor 100 is selected to provide the same number of steps per revolution as there are stationary elbows 93. If no stepping motors 100 are available providing the desired number of steps, electronic circuits may be used so that after completing the desired number of steps, the motor 100 completes the remaining number of steps as substantially a single step. At any rate, the stepping motor 100 and its shafts 101 and 102 are matched to the spacing of the openings 91 through the ring 90, so that at each stationary position of the stepping motor 100, the distributor elbow 96 is rotated one step and moves its outlet 99 from alignment with the end 95 of one stationary elbow 93 to the end 95 of the next stationary elbow 93. As will be seen, the distributing elbow 96 sends one seed per step into the stationary elbow 93 with which it is then aligned and then moves to the next stationary elbow 93.

Instead of being 90° elbows 93 and 96, these members could have some greater angle. A greater angle would ease passage therethrough and might even be able to eliminate the need for the air stream and air inductor 51, but it would also tend to increase the size and mass of the elbow 96 and add its inertia to the load carried by the stepping motor 100. For that reason, 90° elbows are presently preferred.

As stated above, all but one of the stationary elbows 93 is connected to a conduit 54, which is generally vertical and preferably is flexible plastic. The other stationary elbow 93 is used in connection with a home or cycle completion position of the stepping motor 100, and each seed dispensed to this home-position elbow 93 is returned by the air stream via a tube 104 to a cyclone device 105 having a solids outlet 106 dropping into the bowl 57 of a feeder 50 and also having an air outlet 107 through which this air stream is dissipated into the atmosphere. If no air stream is used, the seeds from the homing position may be collected by gravity and returned intermittently or in another manner to the vibrator feeders 50.

The lower shaft 102, which is perfectly synchronized with the upper shaft 101 by mechanical interconnection inside the stepping motor, extends down into a lower housing 108 where it terminates in a lower end 109. A home indicating disc 110, solid except at a single open sector 111, is used to indicate home position and actuate a circuit therefor, as will be seen shortly.

To the lower end 109 of the shaft 102 is attached a friction cap 112 (as by a press fit) for bearing on a damping assembly 113 to reduce rotational oscillation and thereby assure rapid and accurate alignment of the elbow 96 at each step. The damping assembly 113 may comprise a cylindrical barrel 114 affixed to the base of the lower housing 108 having one end open and having slots 115 which are aligned with an antirotational bar 116 embedded in a cylindrical mass 117 of, for example, glass filled epoxy resin. The mass 117 bears at its upper end on the friction cap 112, and at its lower end on a spring 118. The spring 118 bears on a disc 118a near the lower end of the barrel 114. An adjusting screw 119 engages the disc 118a and adjusts the compression of the spring 118, to adjust the degree of damping against the inertial tendency thereof.

Also in the housing 108 is a photoelectric type of sensor 120, having a light source 121 and a sensing device 122 (preferably an NPN phototransistor) to detect the home-position sector 111.

The conduits 54 and the seed-transfer assemblies 55

(FIGS. 1, 2, 10, and 11)

Transfer of the seeds to the shutter 35 is made via the flexible conduits 54 and seed-transfer assemblies 55 to which they are attached. When using four seed-feeding assemblies 31, 32, 33, 34, there may be two seed-transfer assemblies 55. If there are five conduits 54 for each assembly 31, 32, 33, and 34, and there are ten seed receptacles per shutter row, as in the illustrated shutter 35, then two assemblies 55 and 55a each connect with ten conduits 54, as shown in FIG. 10. Each assembly 55 and 55a has a rectangular rack 125 supporting in a row ten vertical open-end tubes 126, preferably of wire mesh or at least perforate to let out the air from the air stream to flow out to atmosphere at this point. Each conduit 54 connects an elbow 93 to a tube 126. The air stream carries the seeds through the elbows 96 and 93 and the conduits 54 into the tubes 126, whence they drop into the shutter 35, each into a separate receptacle 127, while air from the air stream flows out through the walls of the tubes 126. The tubes 126 may be copper screen soldered into an open bottom cylinder 128 having at their lower end an insert 129 of low friction material such as polytetrafluoroethylene, that can slide upon the upper surface of the shutter 35 without setting up undesirable friction.

The shutter 35 may have ten receptacles 127 per row, as shown in FIG. 10, and may have twenty rows, as shown in FIG. 10. The assemblies 55 and 55a may be spaced ten rows apart and be stationary. The shutter 35 is moved one row at a time, in a manner explained below. Thus, rows 1 and 11 are first filled, then rows 2 and 12, then rows 3 and 13, and so on to rows 10 and 20. Then the shutter 35 moves to the planting station 38, releases its seeds, and returns to place rows 1 and 11 beneath the two assemblies 55 and 55a again.

Different sized shutters 35 may be provided. The shutter 35, for example, might have twenty rows of twenty receptacles each, fed either by eight distributors 54 or by four distributors having ten seed stations apiece. Almost any configuration can be used, but the receptacles should be aligned in rows in both directions, for optimum results.

*The circuit operation for the seed-feeding assemblies 31, 32, 33, and 34*

*(FIG. 16)*

Figure 16:
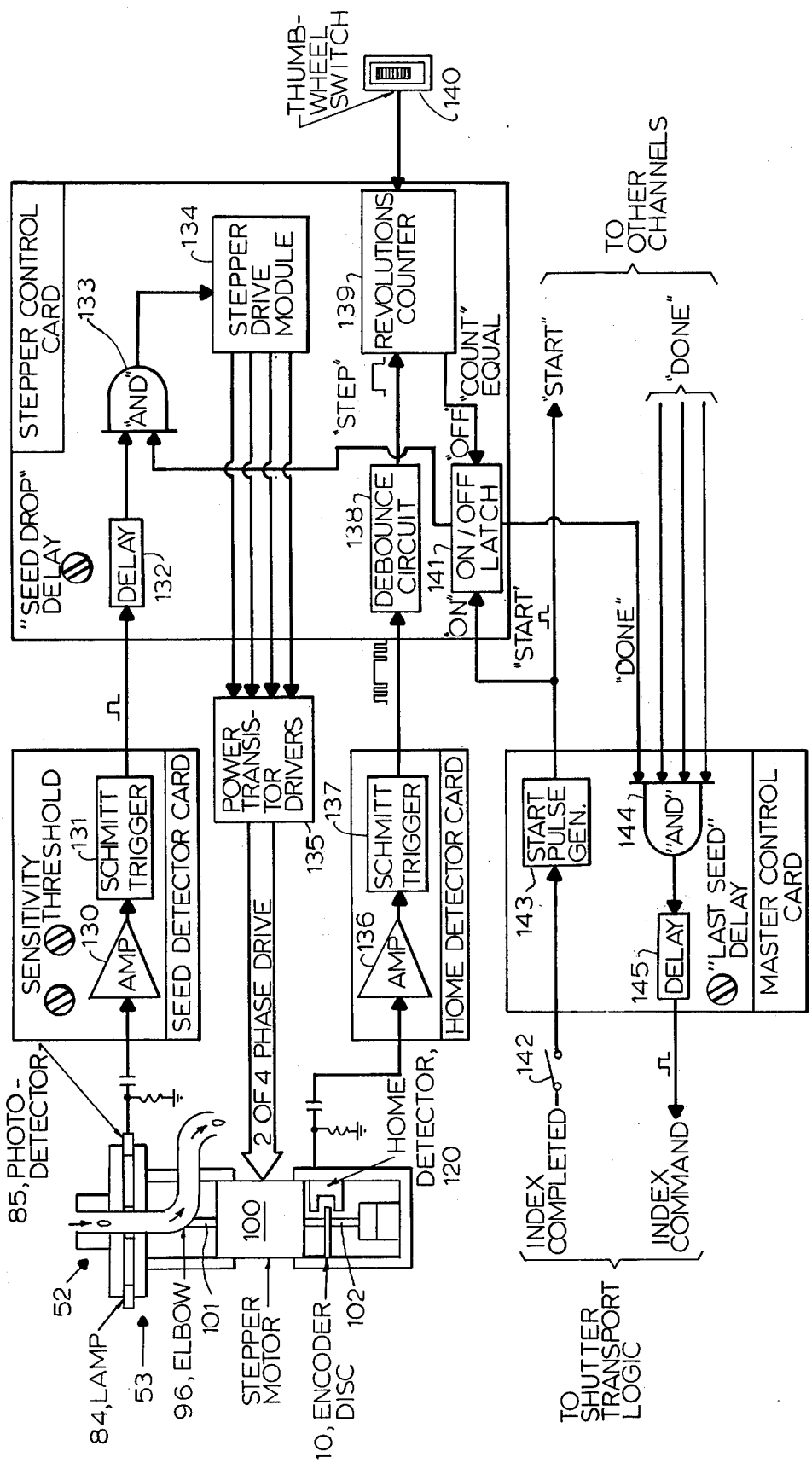
FIG. 16 is a block diagram of the electrical circuit for stepping both the rotary distributors and the shutter transport.

The block diagram, FIG. 16, shows the principal circuit blocks for one seed-feeding assembly 31 (since the corresponding blocks for the other seed-feeding assemblies 32, 33, and 34 are the same) and shows outputs from the other assemblies 32, 33, and 34 combined at an AND gate 144.

The photodetector 52 (e.g., the NPN phototransistor 85) is capacitance coupled to send an A-C signal to an amplifier 130, where the small signal is amplified and is then sent to a Schmitt trigger 131 where it is shaped into a square-edge pulse of duration determined by the seed and its velocity past the photodetector 52. This pulse (typically a +12V to 0V to +12V pulse) then goes to a time delay circuit 132 which is adjusted (as by trial and error) to enable just enough time to insure that the seed has been carried from the photodetector 52 through the distributor elbow 96 and into a stationary elbow 93 before sending a signal via an AND gate 133 to a stepper-drive circuit module 134, the signal being inverted at the gate 133. The stepper-drive module 134 then signals power transistor drivers 135 to drive the stepper motor 100 one step forward. Two-phase drive may be used for this purpose to maximize stepping speed and detent torque.

Starting from home position, this stepping goes step-by-step, one step for each seed passing the detector 52, moving the distributor elbow 96 stepwise to send one seed into each elbow 92 and then, after distributing five such seeds, reaches its home position again, completing one cycle. The encoder disc 110 presents its open sector 111 to the home detector 120 after the distributor elbow 96 leaves the last seed-sowing elbow 93 and thereby sends a rather noisy signal (via capacitance coupling) to an amplifier 136 and to a Schmitt trigger 137, to amplify and shape the signal, which then appears much as shown in FIG. 10. This noisy signal is then sent to a debounce circuit 138, preferably employing a retriggering one-shot and a flip-flop, to shape the signal to a relatively noise-free square-edge pulse that is sent to a revolutions counter 139. When the distributor elbow 96 has reached its home position and is aligned with the home-position elbow 93, the encoder disc 110 presents its solid sector to the home detector 120 once again.

The revolutions counter 139, preferably a four-bit counter, operates in conjunction with a thumb-wheel switch 140. The switch 140 determines how many seeds are to be deposited in each receptacle 127 of the shutter 35. If there is to be a single seed per receptacle 127, the switch 140 is set to "1". If more than one seed is to be deposited in each shutter receptacle 127, the thumb-wheel switch 140 is accordingly set and acts on the revolutions counter 139.

When the number of cycles corresponds to the number set on the thumb-wheel switch 140, the revolutions counter 139 issues a "count equal" signal to an on-off latch 141, which sets the latch 141 to the OFF state. This disables (via the gate 133) the stepper motor 100 from further stepping past the home position and sends a DONE signal to the AND gate 144.

As will be described below, each time the shutter 35 has sown its collected seeds, it returns to a starting position, where it actuates a limit switch 142 (see FIG. 12). Actuation of the limit switch 142 sends a first "index completed" signal to a "start pulse" generator 143, which, in turn sends a "start" signal to all on-off latches, resetting the flip-flops, counters, and one-shot multivibrator. From then on, until the shutter receptacles 127 are filled, the on-off latch 141 sends its signals noting cycle completion to an AND gate 144. This gate 144 collects the signals from all four on-off latches 141 to indicate that each of the seed-feeding assemblies has completed its cycle or cycles, as set on the switch 140. Only when all four assemblies 31, 32, 33, and 34 have completed their prescribed number of cycles does the AND gate 144 send a signal to a time-delay circuit 145. After a time delay sufficient for the seed to flow from the last elbow 93 through the conduits 54 and the tubes 125 into its receptacle 127, an index command signal is sent to move the shutter 35 forward one row. When the shutter 35 reaches its next row, it sends a new "index completed" signal to the start pulse generator 143, and a new cycle is started. When the shutter 35 has had all its receptacles 127 filled with seeds, the sowing cycle described below is initiated.

*The shutter 35*

*(FIGS. 2, 7, and 9–12)*

Figure 7:
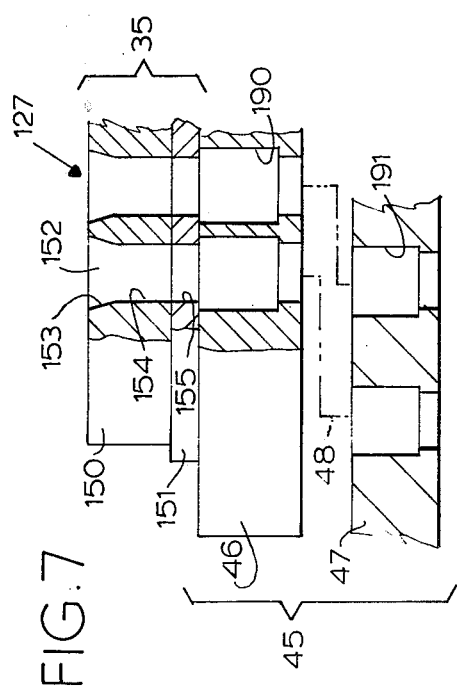
FIG. 7 is a fragmentary view in section of the shutter tray, shutter plate, and distributor plate assembly aligned for planting seeds.

The shutter 35 is comprised of two main elements, a shutter tray 150 and a shutter plate 151 immediately below the shutter tray 150. As shown in FIGS. 7 and 10, the shutter plate 151 is then relative to the shutter tray 150. The receptacles 127 comprise through openings 152 in the shutter tray 150 and imperforate portions of the shutter plate 151. The through openings 152 may have an upper tapered portion 153 facilitating retention of the seeds when they are dropped from the tubes 126, but at least the main, lower portions 154 thereof are cylindrical.

The shutter plate 151 also has through openings 155, which, as shown in FIGS. 7 and 9 are identical in diameter to the portions 154 of the openings 152. Normally, the shutter plate 151 is offset diagonally with respect to the shutter tray 150, and the openings 152 and 155 are so sized and spaced that when this diagonal offset exists, the shutter plate 151 underlies the openings 152 with solid imperforate portions. When the tray 150 and plate 151 are aligned instead of offset, relatively to each other, the seeds drop freely through the openings 155.

As shown in FIG. 17 and somewhat in FIG. 9, a series of bolts 156 are provided; some of them extend down from a head 156a through one of a plurality of diagonally extending slots 157 in the shutter tray 150 and then are threaded into a threaded opening 158 in the shutter plate 151 and, if desired, into a suitable nut 159 bearing against the shutter plate 151; other bolts 156 each extend up from its head 156a through a diagonally extending slot 157a in the shutter plate 151 and then up into an opening 158a in the shutter tray 150. A washer 147 bears against the bolt head 156a, and a washer 148 bears against the tray or plate; between the washers 147 and 148 is a spring 149 which acts to urge the shutter tray 150 and shutter plate 151 toward each other. This structure supports the shutter plate 151 snugly against the tray 150.

When viewed from above, the plate 151 is offset from the tray 150 when the bolts 156 are at the upper left end of the slots 157 and at the lower right end of the slots 157a; and the tray 150 and plate 151 are aligned when the bolts 156 are at the lower right end of the slots 157 and at the upper left end of the slots 157a. Thus relative movement of the plate 151 and tray 150 are limited to two positions, one providing a bottom for the receptacle 127 and the other aligning the openings 152 and 153.

Movement of the shutter 35 for the sowing cycle (FIGS. 2 and 10–14)

The shutter tray 150 is supported by three brackets 160, two on one side of the tray 150 and one on the other side, as shown in FIG. 2. The main frame 30 has two portions 161 that are horizontal and parallel and each support on their facing surfaces, a rail 162. As shown in FIG. 11, each bracket 160 carries a freely rotatable roller 163 for the upper surface of the rail 162 and a similar roller 164 for the lower surface of the rail 162. Thus the shutter 35 rolls freely on the rails 162.

As best seen in FIGS. 12 and 2, a forward end 165 of the shutter tray 150 has a central anchor 166 engaged by a hook 167 of a cable 168. The rear edge 169 of the tray 150 is attached to a timer belt 170, a wide reinforced timer belt having a series of transverse ribs and grooves. The timer belt 170 passes around an upper sheave 171 on a shaft 172, used for tension adjustment, then around a sheave 173 on an indexing shaft 174, and then around a drive wheel 175 driven by the motor 37, preferably a hydraulic motor. When actuated, the hydraulic motor 37 can pull the shutter 35 in forwardly or rearwardly, for the timer belt 170 is connected to the cable 168, which passes around two sheaves 177 and 178.

The indexing shaft 174, as shown in FIG. 13 carries an index wheel 180 having a series of circumferentially spaced-apart radial projections 181. A photosensitive index sensor (or a proximity sensor) 182 has a slot 183 into which a projection 181 enters one at a time to interrupt a light path between a light source 184 and a photosensitive element 185 such as a phototransducer (or interrupts a magnetic field). It is the phototransducer 185 that gives the "index completed" signal fed to the circuit of FIG. 16, while the motor 37 is actuated by the "index command" signal of FIG. 16 and remains actuated until the index wheel 180 cuts the light path by one of its projections 181 entering the slot 183 and causing the element 185 to issue its "index completed" signal. The elements are so proportioned that each "index command" signal moves the shutter 35 exactly the distance of one row of receptacles 127.

When all the rows of receptacles 127 have been filled with the desired number of seeds the "index command" signal causes the shutter 35 to proceed on until it trips a limit switch 186 at the exact point where the shutter 35 properly overlies the distributor plate assembly 45.

At this time (See FIG. 4), just before engagement of the limit switch 186, a pivoted plate 187 on the tray 100 engages a stop 188 on the frame 160 and pivots around its pivot pin 189, releasing the shutter plate 151 so that it is pulled diagonally by a spring 192 attached by a cable 193 to the shutter plate 151, as guided by the projections 156 and slots 157, to align the openings 155 with the openings 152, and the seeds drop through the shutter 35, through openings 190 in the upper distributor plate 46, down the conduits 48, through openings 191 in the lower distributor plate 47 and into the capsules 43. After just enough delay to enable dispensing of the seeds the motor 37 is actuated to move in reverse, moving the shutter 35 back toward its starting position and also enabling a spring 195 to retract the shutter plate 151 to its normal position placing a solid bottom beneath the openings 152. The shutter 35, when retracted, engages a limit switch 196, which again reverses its direction of movement and it moves forward until a cam 197 on the shutter 35 actuates the indexing limit switch 142, and a new cycle of filling the receptacles 127 with seeds begins. The cam 197 is long enough (e.g., ten rows long) to hold the limit switch 142 depressed (so as to insure row-by-row indexing) until the shutter's receptacles 127 are all filled.

At the same time as actuation of the limit switch 196, the conveyor 40 is actuated to begin moving. It moves the rack 42 out from its planting position 38 and moves a new rack 42 to the planting position 38. The limit switch 44 is swung out of the way to let the seeded rack 42 past and then swings back ready for engagement by the next rack 42. Rapid deceleration of the conveyor 40 when the next rack 42 actuates the limit switch 44 may be achieved by using a normally-ON solenoid brake mounted between the drive motor for the conveyor 40 and its gear train reducer.

Thus, the limit switch 186 stops the shutter 35 over the planting station 38, its circuit providing (preferably) a short time delay to ensure dropping of the seeds from the shutter 35, and then reverses the direction of movement of the shutter 35. The limit switch 196 again reverses the shutter's direction of travel to forward, and starts the conveyor 40. The limit switch 142 defines indexing and remains actuated as long as there is indexing, row-by-row, of the shutter 35, in coordination with transverse shaft 174 and the disc 180. The shutter 35 travels continuously, either forward or back until the index switch 186 or 196 is actuated. All limit switches 142, 186, and 196 are actuated in one direction only, swinging freely in the other direction.

The distributor plate assembly 45 is used so that the spacing of the receptacles 127 of the shutter 35 need not be identical to the spacing of the capsules 43 in the rack 42. Also, the openings 190 may be larger than the openings 152 and 155, while the conduit 48 may be smaller, as may the openings 191, thereby giving a kind of funnel effect. When different spacing is required, as when a different size capsule 43 is used, possibly requiring a different size of rack 42, the lower distributor plate 47 may be replaced with an appropriately sized plate 47 having different spacing for its through openings 191. There is no need for using a different shutter 35 or upper distributor plate 46, and the flexibility of the conduits 48 makes the change in plates 47 feasible and quick.

The amount of movement of the shutter 35 between its last seed-receiving position, when rows ten and twenty are filled, and its seed-dispensing position may be made very small, or, if desired can be relatively large. The return movement is necessarily larger, being at least somewhat greater than half the length of the shutter 35.

Between the last seed-receiving position of the shutter 35 and the first seed-receiving position of its next seed-receiving cycle, the rotary seed distributors 53 remain in their home position, and seeds are recycled to the vibratory feeder 50 via the conduits 104 and the cyclones 105. The operation is rapid, but this arrangement assures that seeds will be recycled whenever they are not being actually fed to the shutter 35. Only when the shutter 35 is back at its first seed-receiving station does the distributing elbow 96 leave its home position.

The position of the rack 42 under the lower distributor plate 47 is preferably held within ±0.25 cm, which is well within a tolerance of ±0.5 cm for trays 42 carrying capsules 43 that are 2.5 cm in diameter. There may be either manual or automatic loading at the ends of the conveyor 40, as desired. Accuracy in sowing is also enhanced by having a pneumatic cylinder-piston assembly 194 beneath the conveyor 40 at the planting station 38 which is actuated by the limit switch 44 (via a solenoid valve) to force the rack 42 up until the capsules 43 actually bear against the lower distributor plate 44. The pneumatic device 194 releases the conveyor 40 when the shutter 35 starts back toward its first seed-receiving position.

Some remarks on performance

Test racks 42 taken at intervals during operation of a machine substantially like that described above yielded accuracy levels very close to design specifications. Design specifications and test results were as follows:

| Species | Design | | Actual | |
|---|---|---|---|---|
| | % Blanks | % Doubles | % Blanks | % Doubles |
| Ponderosa pine (*Pinus Ponderosa*)* | <2.0 | <1.0 | <0.5 | 1.5 |
| Lodgepole pine (*Pinus contorta*)* | <2.0 | <1.0 | <0.5 | 2.8 |
| Douglas-fir (*Pseudotsuga menziesii*)* | <4.0 | <1.0 | <0.5 | 2.5 |
| Western hemlock (*Tsuga heterophylla*)* | <4.0 | <1.0 | <0.5 | 3.8 |

*two seeds per capsule 43

Sower accuracy is highly dependent upon purity of seed, not upon seed morphology. If a seed lot has 1.5% non-seed particles mixed with the seed, sowing 1.5% blanks will result. Because the rotary distributor 53 will not operate without the triggering signal caused by a seed or chaff particle passing the photodetector 52, the sower is fail safe against total blanks, i.e., against a receptacle 127 being bypassed without receiving any particle.

Doubles can result only when the time period between seeds is less than that required for movement of the elbow 96. As long as seeds are fed from the vibratory feeder 50 slower than the indexing speed of the stepper motor 100, doubles will not occur.

Time to sow a nursery rack 42 depends upon the number of seeds sown per capsule. For example, without introducing excessive seed the following can be done:

Single sowing — 24 seconds per 200 cavity tray (2.5 racks 42 per min.)

Double* sowing — 39 seconds per 200 cavity tray (1.54 racks 42 per min.)

Triple** sowing — 60 seconds per 200 cavity tray (1.00 racks 42 per min.)

* two seeds per capsule 43
** three seeds per capsule 43

The invention may also be used to sow seeds from one or more seed-sowing assemblies directly into containers or flats, without any intervening shutter, the flat or rack of containers moving one row forward after each planting, just as the shutter has been described as doing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for sowing seeds, comprising:

providing seeds from storage to each of a plurality of seed streams, detecting in each said seed stream each seed therein as it passes a predetermined location, cyclically distributing in stepwise fashion the detected seeds in each said seed stream into each of a series of substreams, the stepping from one substream to the next being actuated by the detecting step, each cycle ending at a home position, from which seeds distributed thereto are returned to storage instead of being distributed into a substream, sensing said home position in each cycle, dispensing each seed in each cycle and from each of said streams into different receptacles of a translatable shutter having a series of rows of receptacles, translating said shutter forward one row at the completion of each of a given number of cycles, upon completion of a series of said given number of cycles sufficient to fill all the receptacles of said shutter, translating said shutter to a planting position, dropping all said seeds from said shutter into planting medium at said planting position, returning said shutter back to an initial seed receiving position after its said seeds have been dropped, and again dispensing seeds into said shutter as before.

2. The method of claim 1 wherein said detecting step is performed photoelectrically by partial interruption of a light beam by each said seed.

3. The method of claim 2 wherein each said detecting step actuates said stepping only after a delay sufficient for each detected seed to pass into its substream.

4. The method of claim 3 wherein each said translating step is actuated by said home position sensing, after delay sufficient to enable all the seeds from the dispensing step to reach their respective receptacle in said shutter.

5. The method of claim 4 wherein said sensing step is performed photoelectrically.

6. The method of claim 1 wherein the dropping step includes changing the spacing of said seeds to conform them to the desired spacing of plants in said planting medium into which they are dropped.

7. The method of claim 1 comprising holding said home position during each step of translation of said shutter, including the step to said planting position, and also during the time of dropping its seeds and returning said shutter to its initial seed receiving position.

8. The method of claim 1 wherein said given number of cycles is one, so that each receptacle receives one and only one seed.

9. A method for sowing seeds into containers, comprising:
singulating seeds from a plurality of storage receptacles to provide a plurality of singulated seed streams,
inducting each singulated stream from each said seed stream into a separate air stream,
detecting in each said air stream each seed therein as it passes a predetermined location,
cyclically distributing in stepwise fashion the seeds in each air stream into each of a series of air substreams, the stepping from one air substream to the next being actuated by the detecting step, each cycle concluding at a home position, from which seeds are returned to storage,
sensing said home position in each cycle,
dispensing each seed from each said cycle and from each of said substreams into a different receptacle of a translatable shutter having a series of rows of said receptacles,
translating said shutter forward one row at the completion of each of a given number of said cycles,
upon completion of a series of said given number of cycles sufficient to fill all the receptacles of said shutter, translating said shutter to a planting position,
dropping all said seeds from said shutter into planting medium at said planting position, each receptacle dropping its contents at a different location,
returning said shutter back to an initial seed receiving position after its said seeds have been dropped, and again dispensing seeds into said shutter as before.

10. The method of claim 9 wherein said detecting step is performed photoelectrically by each said seed partially interrupting a light beam across its said air stream.

11. The method of claim 10 wherein said photoelectric detecting step actuates said stepping electronically and includes providing a time delay sufficient for each detected seed to pass into its distributed air substream.

12. The method of claim 11 wherein said translating step is actuated by said home position sensing, said sensing being photoelectric and electronic and includes providing a time delay sufficient to enable all seeds from the dispensing step to reach their respective receptacle in said shutter.

13. The method of claim 9 wherein the dropping step includes changing the spacing of said seeds from the spacing of said receptacles to the spacing of said locations at which they are dropped.

14. The method of claim 13 including the steps of grouping containers together, conveying them to said dropping step, and aligning them there before said dropping step so that each receptacle drops its seeds into a different said container, and then conveying said containers away therefrom after said dropping step, and conveying a succeeding group of conveyors there and aligning them there before the next said dropping step.

15. The method of claim 9 comprising retaining distribution of seeds to said home position during each step of translation of said shutter, including the step to said planting position, and also during the dropping of seeds, and the returning of said shutter.

16. The method of claim 9 including dissipating the air from each said air substream into the atmosphere during said dispensing step.

17. A method for sowing seeds, comprising:
singulating seeds from storage into a seed stream,
detecting each seed in said stream as it passes a predetermined point,
cyclically distributing in stepwise fashion the successive seeds in said stream into each of a series of substreams, the stepping from one substream to the next being actuated by the detecting step, each cycle ending at a home position, from which seeds are returned to storage, and
dispensing each seed from each substream into a different receptacle.

18. The method of claim 17 wherein the detecting step is performed photoelectrically with each seed partially interrupting a light beam across said stream.

19. The method of claim 17 wherein said stream is inducted into a transporting air stream from said singulated step and including dissipating the air from said air stream into the atmosphere during said dispensing step.

20. The method of claim 17 wherein said detecting step actuates said stepping only after a delay sufficient for the detected seed to pass into its distributed substream.

21. Apparatus for sowing seeds, comprising:
means for providing seeds from storage to each of a plurality of seed streams,
means for detecting in each said seed stream each seed therein as it passes a predetermined location,
means for cyclically distributing in stepwise fashion the detected seeds in each said seed stream into each of a series of substreams, the stepping from one substream to the next being actuated by said means for detecting, each cycle ending at a home position having means for returning seeds therefrom to storage,
means for sensing when each said home position is reached in each cycle,
a translatable shutter having a plurality of rows of receptacles,
means for dispensing each seed in each said substream into a separate said receptacle, means translating said shutter forward a distance of one row at the completion of each of a selected number of said cycles, means for translating said shutter to a planting position, upon completion of cycles sufficient to fill all the receptacles of said shutter, means for dropping all said seeds from said shutter into planting medium at said planting position, and means for returning said shutter back to an initial seed receiving position after its said seeds have been dropped.

22. The apparatus of claim 21 wherein said means for detecting in each said stream comprises a light source sending a light beam across said stream, said light beam being interrupted by each seed in the stream falling across it, and light sensitive means to which said light beam is directed lying on the opposite side of the seed stream from said light beam.

23. The apparatus of claim 22 wherein said interruption of said light beam actuates said means for stepping through an electronic circuit having means for providing a time delay sufficient for the detected seed to pass to its distributed substream.

24. The apparatus of claim 23 wherein said means for translating is actuated by said means for sensing, which comprises means providing a time delay sufficient to enable all the seeds dispensed to reach their respective receptacle in said shutter.

25. The apparatus of claim 24 wherein said means for sensing is a photoelectric device.

26. The apparatus of claim 21 wherein the means for dropping includes means for changing the spacing of said seeds from the spacing of said receptacles to the desired spacing in said planting medium into which they are dropped.

27. The apparatus of claim 26 wherein said seeds are dropped into a group of containers holding said planting medium held at a desired spacing.

28. The apparatus of claim 21 comprising means for retaining each said means for distributing at its said home position during the translation of said shutter from row to row and during time for translation to said planting position, dropping of the seeds, and returning of the shutter to its said initial seed-receiving position.

29. The apparatus of claim 21 wherein said means for providing comprises means for singulating seeds from said storage and means for conducting each singulated seed into a transporting air stream.

30. The apparatus of claim 29 including means dissipating the air from said substreams into the atmosphere during the dispensing of seeds into said shutter.

31. The apparatus of claim 21 wherein said shutter comprises a shutter tray and a shutter plate below said shutter tray, said receptacles comprising through openings through said shutter tray and imperforate portions of said shutter plate therebelow, said shutter plate also having through openings, said means for dropping comprising means for aligning the through openings of said shutter plate with those of said shutter tray.

32. A seed sowing device including in combination:
a plurality of seed singulating feeding means for providing a plurality of singulated seed streams,
a corresponding plurality of seed detection means for detecting each seed in each seed stream as it passes a predetermined point,
a rotary seed distributor for each seed stream, including a single inlet, a series of outlets, a rotatable distributor member for connecting said inlet in sequence to each said outlet, and stepping means for moving said distributor member from outlet to outlet in each cycle, the last said outlet in each cycle being a home position outlet,
stepping actuating means for each said stepping means, actuated by the seed detection means for its associated seed stream, for moving said stepping means one step in its cycle up to home position for each seed detected,
home position sensing means for sensing each time said distributor member reaches said home position outlet,
seed recycling means connected to said home position outlet for recycling seed dispensed to the home position outlet back to said feeding means,
a movable shutter having a series of rows of said receiving receptacles,
a plurality of spaced-apart racks of tubes, each rack overlying one row of receptacles, one tube for each receptacle in that row, said racks being spaced apart by a number of rows corresponding to the total number of rows divided by the number of racks,
a first series of conduits connecting each said outlet, except said home position outlet, of each said rotary seed distributor to a said tube,
cycle-number determining means for setting how many cycles said stepping means is to rotate said distributor member, and therefore how many seeds are to be distributed to each receptacle, between successive actuations of said translating means,
translating means actuated by said home position sensing means in combination with said cycle number determining means for moving said shutter one row forward each time it is actuated, until all receptacles of all rows have been supplied with a selected number of seeds, and then for moving said shutter to a seed planting position,
conveyor means for conveying a series of seed-receiving means incorporating planting medium, one at a time, each having planting locations corresponding in number to said receptacles, to a seed planting position,
conveyor halting means for stopping said conveyor each time a said seed-receiving means reaches planting position,
shutter release means for dropping said seeds from said receptacles and into said seed-receiving means after said shutter has reached said planting station,
return means for returning said shutter, after the seeds have been released from said shutter, to a starting position with its first row beneath one said rack of tubes,
cycle initiating means for starting the cyclic dispensing of seeds into said receptacles once again after said shutter has been returned to its said starting position, and
starting means for starting said conveyor while said shutter is being returned to its starting position, for moving the seeded seed-receiving means away from said planting position and moving new unseeded seed-receiving means into said planting position.

33. The seed sowing device of cliam 32 wherein each said seed detection means comprises:
a light source,
a light path transverse to said seed stream, said air stream lying within opaque walls, a photoelectric device in said light path on the opposite side of said seed stream from said light source, an electronic amplifier connected to said photoelectric device for amplifying signals resulting by partial blockage of said light path due to the passage of a seed across it, and means for shaping the amplified signal into a sharp pulse of definite duration.

34. The seed sowing device of claim 33 wherein each said stepping means is actuated by drive means which is actuated by said pulse after a delay long enough for said seed to pass from said seed detection means into one of said outlet of said seed distributor.

35. The seed sowing device of claim 33 wherein each said home position sensing means comprises:
 a disc driven by said stepping means and having a light transmitting sector corresponding to said home position,
 a photoelectric detector having a light source and a photoelectric sensor on opposite sides of said disc and in line with each other,
 an amplifier connected to said photoelectric sensor for amplifying the home position signal therefrom,
 means for shaping the amplified signal into a pulse of definite shape and duration, and
 debounce means for eliminating noise from said pulse to produce a clear square pulse therefor.

36. The seed sowing device of claim 35 having:
 a counter for counting the number of cycles completed between shutter translations, by each home position being sensed,
 a comparator means for each counter for comparing the number of cycles completed with those set on said cycle-number determining means and indicating when they are equal,
 an on-off electronic latch actuated by said comparator means,
 an AND gate actuated by the on-off latch for all of said comparator means, and
 a time delay circuit actuated by said AND gate for delaying actuation of said first translating means until sufficient time has elapsed for the last seed from all said rotary distributors to have reached a shutter receptacle.

37. A seed sowing device including in combination:
 a plurality of seed singulating feeding means for providing a plurality of singulated seed streams,
 a corresponding plurality of induction means for inducting each singulated seed from each said seed stream into one of a corresponding plurality of air streams,
 a corresponding plurality of seed detection means for detecting each seed in each air stream as it passes a predetermined point,
 a rotary seed distributor for each air stream, including a single inlet from its said air stream, a series of outlets, a rotatable distributor member for connecting said inlet in sequence to each said outlet, and a stepping motor for moving said distributor member from outlet to outlet in a cycle, the last said outlet in each cycle being a home position outlet,
 first actuating means for each stepping motor, actuated by the seed detection means for its associated air stream, for moving said stepping motor one step in its cycle up to home position for each seed detected,
 home position sensing means for sensing each time said distributor member reaches said home position outlet,
 seed recycling means connected to said home position outlet for recycling seed dispensed to the home position outlet back to said feeding means,
 a movable shutter having a series of rows of seed-receiving receptacles,
 a plurality of spaced-apart racks of tubes, each rack overlying one row of receptacles, one tube for each receptacle in that row, said racks being spaced apart by a number of rows corresponding to the total number of rows divided by the number of racks,
 a first series of conduits connecting each said outlet, except said home position outlet, of each said rotary seed distributor to a said tube,
 translating means for moving said shutter one row forward each time said first translating means is actuated, until all receptacles of all rows have been supplied with a selected number of seeds,
 cycle-number determining means for setting how many cycles said stepping motor is to rotate, and therefore how many seeds are to be distributed to each receptacle, between successive actuations of said translating means,
 second actuating means responsive to said home position sensing means and said cycle-number determining means for all said rotary seed distributors for actuating said translating means only after all said rotary distributors have completed the set number of cycles,
 conveyor means for conveying seed-receiving means incorporating planting medium, one at a time, each seed-receiving means having planting locations corresponding in number to said receptacles, to a seed planting position,
 conveyor halting means for stopping said conveyor each time a said seed-receiving means reaches said planting position,
 stationary transfer means at said transfer position for overlying said seed-receiving there and having a series of rows of seed receiving passages corresponding exactly in number to the number of said receptacles and to the number of said planting locations, said passages at their upper ends being spaced exactly as said receptacles and at their lower ends being spaced exactly as said seed-receiving means,
 said translating means when actuated at its final row after said shutter receptacles have all been filled with the desired number of seeds per receptacle, moving said shutter to said planting position immediately above said transfer means and in alignment therewith,
 shutter release means for dropping said seeds from said receptacles through said transfer means and into said seed-receiving means after said shutter is aligned with said transfer means,
 reverse translating means for translating said shutter back to a starting position with its first row beneath one said rack of tubes after the seeds have been released from said shutter,
 cycle initiating means for starting the cyclic dispensing of seeds into said receptacles once again after said shutter has been returned to its said starting position, and starting means for starting said conveyor after planting of said seeds for moving the seeded seed-receiving means away from said planting position and moving an unseeded seed-receiving means into said planting position.

38. The seed sowing device of claim 37 wherein each said seed detection means comprises:
a light source,
a light path transverse to said air stream, said air stream lying within opaque walls,
a photoelectric device in said light path on the opposite side of said air stream from said light source,
an electronic amplifier connected to said photoelectric device for amplifying signals resulting by partial blockage of said light path due to the passage of a seed across it, and
means for shaping the amplified signal into a sharp pulse of definite duration.

39. The seed sowing device of claim 38 wherein each said stepping motor is actuated by drive means which is actuated by said pulse after a delay long enough for said seed to be carried from said seed detection means into one of said outlets of said seed distributor.

40. The seed sowing device of claim 39 wherein each said home position sensing means comprises:
a shaft on said stepping motor,
a disc on said shaft having a light-transmitting sector corresponding to said home position,
a photoelectric detector having a light source and a photoelectric sensor on opposite sides of said disc and in line with each other,
an amplifier connected to said photoelectric sensor for amplifying the home position signal therefrom,
means for shaping the amplified signal into a pulse of definite shape and duration, and
debounce means for eliminating noise from said pulse to produce a clear square pulse therefor.

41. The seed sowing device of claim 40 wherein each said second actuating means comprises:
a counter for counting the number of cycles completed, by each home position being sensed,
a comparator means for each counter for comparing the number of cycles completed with those set on said cycle-number determining means and indicating when they are equal,
an on-off latch actuated by said comparator means,
an AND gate actuated by the on-off latch for all of said comparator means, and
a time delay circuit actuated by said AND gate for delaying actuation of said first translating means until sufficient time has elapsed for the last seed from all said rotary distributors to have reached a shutter receptacle.

42. The seed sowing device of claim 37 wherein each said stepping motor has a shaft projecting therefrom, said rotatable distributor member being an elbow tube, with its inlet at the end of said air stream and having an outlet opening secured to said shaft, said outlets comprising a series of stationary elbows positioned around a circle, each having an inlet aligned with the outlet opening of said elbow tube once per cycle, said elbows, except for the one at the home position, being connected respectively to said conduits.

43. The seed sowing device of claim 42 wherein all said elbows are 90° elbows.

44. The seed sowing device of claim 37 wherein said tubes are previous, for dissipating the air from the air streams into the atmosphere.

45. The seed sowing device of claim 37 wherein said seed recycling means comprises a cyclone air-solids separator located just above said feeding means.

46. The seed sowing device of claim 37 wherein said shutter comprises a shutter tray and a shutter plate immediately beneath said tray, both said plate and tray having alignable through openings, said plate being normally arranged to place an imperforate portion beneath each said tray opening, to provide said receptacles, said shutter release means moving the openings of said plate into alignment with the tray openings.

47. The seed sowing device of claim 46 wherein said translating means and said return translating means include:
a timing belt secured to one end of said shutter and passing around a drive wheel of an hydraulic motor and also around a sheave on a transverse shaft and connected to the other end of said shutter by a cable and sheave system,
distance counting means on said transverse shaft for de-energizing said hydraulic motor after movement of said shutter corresponding to the distance from one row to the next,
limit switches energized by said shutter at the extreme limits of shutter travel, one said limit switch causing said return of said shutter, another said limit switch actuating the distributing of seeds into said shutter receptacles after return, and
a stop and pivoted latch combination engaged at the actuating position for the former said limit switch for moving said shutter plate relative to said tray to produce alignment of their respective openings.

48. The seed sowing device of claim 47 wherein said distance counting means comprises a disc on said transverse shaft and an electromagnetic device having an electromagnetic path interrupted by portions of said disc at the desired distances.

49. A seed sowing device including in combination:
four seed singulating feeding means for providing four singulated seed streams,
four induction means for inducting each singulated seed from each said seed stream into one of four air streams,
four seed detection means, one for detecting each seed in each air stream as it passes a predetermined point,
a rotary seed distributor for each air stream, including a single inlet from its said air stream, a series of six outlets, a rotatable distributor member for connecting said inlet in sequence to each said outlet, and a stepping motor for moving said distributor member from outlet to outlet in a cycle, the sixth said outlet being a home position outlet,
first actuating means for each stepping motor actuated by the seed detection means for its associated air stream, for moving said stepping motor one step in its cycle up to home position for each seed detected,
home position sensing means for sensing each time said distributor member reaches said home position outlet,
seed recycling means connected to said home position outlet for recycling seed dispensed to the home position outlet back to said feeding means,
a movable shutter having a series of twenty rows of ten seed receiving receptacles each,
a pair of spaced-apart racks of ten tubes each, each rack overlying one row of receptacles, one tube for each receptacle in that row, said racks being spaced ten rows apart, a first series of conduits connecting each of the first five outlets of each said rotary seed distributor to five said tubes, so that each rack is fed by two said rotary seed distributors, translating means actuated by said home position sensing means for moving said shutter one row forward each time said first translating means is actuated, until all ten receptacles of all twenty rows have been supplied with a selected number of seeds, cycle-member determining means for setting how many cycles said stepping motor is to rotate, and therefore how many seeds are to be distributed to each receptacle, between successive actuations of said translating means, second actuating means responsive to said home position sensing means and said cycle-number determining means for all said rotary seed distributors for actuating said translating means only after all four said rotary distributors have completed the set number of cycles, conveyor means for conveying racks of planting capsules, one rack at a time, each rack having twenty rows of capsules, ten capsules per row, to a seed planting position, conveyor halting means for stopping said conveyor each time a said group of planting receptacles reaches said planting position, stationary transfer means at said transfer position for overlying said racks there and having twenty rows of ten seed receiving passages each, said passages at their upper ends being spaced exactly as said receptacles and at their lower ends being spaced exactly as said capsules, said translating means when energized upon the last rows of said shutter receptacles being filled with the desired number of seeds per receptacle, moving said shutter to said planting position immediately above said transfer means and in alignment therewith, shutter release means for dropping said seeds from said receptacles through said transfer means and into said capsules after said shutter is aligned with said transfer means, return translating means for translating said shutter back to a starting position with its first row beneath one said rack of tubes, and its eleventh row beneath the other said rack of tubes, after the seeds have been released from said shutter, cycle initiating means for starting the cyclic dispensing of seeds into said receptacles once again after said shutter has been returned to its said starting position, and starting means for starting said conveyor upon return of said shutter has returned to its starting position, for moving the rack of seeded capsules away from said planting position and moving a new rack of unseeded capsules into said planting position.

50. A seed dispensing device for a seed sower including in combination:

seed feeding means for feeding seeds one at a time, seed detection means for detecting each seed as it passes a predetermined point, a rotary seed distributor having a single inlet for seeds, a series of outlets, a rotatable distributor member for connecting said inlet in sequence to each said outlet, and a stepping motor for moving said distributor member from outlet to outlet in a cycle, the last said outlet in each cycle being a home position outlet, actuating means for said stepping motor actuated by said seed detection means for moving said stepping motor one step in its cycle up to home position for each seed detected, home position sensing means for sensing each time said distributor member reaches said home position outlet, seed recycling means connected to said home position outlet for recycling seed passing to that outlet back to said seed feeding means, a series of conduits, one connecting each said outlet, except said home position outlet, to a dispensing position.

51. The seed sowing device of claim 49 wherein each said stepping motor is actuated by drive means which is actuated by said seed detection means after a delay long enough for said seed to pass from said seed detection means into one of said outlets of said seed distributor.

52. The seed sowing device of claim 49 wherein each said stepping motor has a shaft projecting therefrom, said rotatable distributor member being an elbow tube, with its inlet at the end of said air stream and having an outlet opening secured to said shaft, said outlets comprising a series of stationary elbows positioned around a circle, each having an inlet aligned with the outlet opening of said elbow tube once per cycle, said elbows, except for the one at the home position, being connected respectively to said conduits.

53. A seed dispensing device for a seed sower including in combination:

seed feeding means for feeding seeds one at a time, induction means for inducting each seed from said seed feeding means into a transporting air stream, seed detection means for detecting each seed in said air stream as it passes a predetermined point, a rotary seed distributor having a single inlet from said air stream, a series of outlets, a rotatable distributor member for connecting said inlet in sequence to each said outlet, and a stepping motor for moving said distributor member from outlet to outlet in a cycle, the last said outlet in each cycle being a home position outlet, actuating means for said stepping motor actuated by said seed detection means for moving said stepping motor one step in its cycle up to home position for each seed detected, home position sensing means for sensing each time said distributor member reaches said home position outlet, seed recycling means connected to said home position outlet for recycling seed passing to that outlet back to said seed feeding means, a shutter having a series of rows of seed receiving receptacles, a series of conduits, one connecting each said outlet, except said home position outlet, to a position immediately above a said receptacle in one row of said shutter, translating means actuated by said home position sensing means for moving said shutter one row forward after home position has been sensed a desired number of times.

54. The seed sowing device of claim 53 wherein said seed detection means comprises:

a light source, a light path transverse to said air stream, said air stream lying within opaque walls, a photoelectric device in said light path on the opposite side of said air stream from said light source, an electronic amplifier connected to said photoelectric device for amplifying signals resulting by partial blockage of said light path due to the passage of a seed across it, and means for shaping the amplified signal into a sharp pulse of definite duration.

55. The seed sowing device of claim 54 wherein each said stepping motor is actuated by drive means which is actuated by said pulse after a delay long enough for said seed to pass from said seed detection means into one of said outlets of said seed distributor.

56. The seed sowing device of claim 55 wherein each said home position sensing means comprises:

a shaft on said stepping motor, a disc on said shaft having a light transmitting sector corresponding to said home position, a photoelectric detector having a light source and a photoelectric sensor on opposite sides of said disc and in line with each other, an amplifier connected to said photoelectric sensor for amplifying the home position signal therefrom, means for shaping the amplified signal into a pulse of definite shape and duration, and debounce means for eliminating noise from said pulse to produce a clear square pulse therefor.

57. The seed sowing device of claim 53 wherein each said stepping motor has a shaft projecting therefrom, said rotatable distributor member being an elbow tube, with its inlet at the end of said air stream and having an outlet opening secured to said shaft, said outlets comprising a series of stationary elbows positioned around a circle, each having an inlet aligned with the outlet opening of said elbow tube once per cycle, said elbows, except for the one at the home position, being connected respectively to said conduits.

58. The seed sowing device of claim 57 wherein all of said elbows are 90° elbows.

59. The seed sowing device of claim 57 having a second shaft for said stepping motor extending in the opposite direction from its other shaft and having damping means therefor to reduce vibration at the end of each step thereof.

60. The seed sowing device of claim 59 wherein each said home position sensing means comprises:

a disc on said second shaft having a light transmitting sector corresponding to said home position, and a photoelectric detector having a light source and a photoelectric sensor on opposite sides of said disc and in line with each other.

61. Apparatus for sowing seeds, comprising:

means for providing seeds from storage to each of a plurality of seed streams, means for detecting in each said seed stream each seed therein as it passes a predetermined location, means for cyclically distributing in stepwise fashion the detected seeds in each said seed stream into each of a series of substreams, the stepping from one substream to the next being actuated by said means for detecting, each cycle ending at a home position having means for returning seeds therefrom to storage, means for sensing when each said home position is reached in each cycle, a seed receptor having a plurality of rows of receiving loci, means for dispensing each seed in each said substream into a separate said locus, and means translating said seed receptor forward a distance of one row at the completion of each of a selected number of said cycles.

62. The apparatus of claim 61 wherein said means for detecting in each said stream comprises a light source sending a light beam across said stream, said light beam being interrupted by each seed in the stream falling across it, and light sensitive means to which said light beam is directed lying on the opposite side of the seed stream from said light beam.

63. The apparatus of claim 62 wherein said interruption of said light beam actuates said means for stepping through an electronic circuit having means for providing a time delay sufficient for the detected seed to pass to its distributed substream.

64. The apparatus of claim 63 wherein said means for translating is actuated by said means for sensing, which comprises means providing a time delay sufficient to enable all the seeds dispensed to reach their respective receptacle in said shutter.

65. The apparatus of claim 64 wherein said means for sensing is a photoelectric device.

66. The apparatus of claim 61 wherein said means for providing comprises means for singulating seeds from said storage and means for conducting each singulated seed into a transporting air stream.

67. The apparatus of claim 62 including means dissipating the air from said substreams into the atmosphere during the dispensing of seeds into said seed receptor.

68. A method for sowing seeds, comprising:

singulating seeds from storage into a seed stream, detecting each seed in said stream as it passes a predetermined point, cyclically distributing in stepwise fashion the successive seeds in said stream into each of a series of substreams, the stepping from one substream to the next being actuated by the detecting step, each cycle ending at a home position, from which seeds are returned to storage, and dispensing each seed from each substream into a different locus.

69. The method of claim 68 wherein the detecting step is performed photoelectrically with each seed partially interrupting a light beam across said stream.

70. The method of claim 68 wherein said stream is inducted into a transporting air stream from said singulated step and including dissipating the air from said air stream into the atmosphere during said dispensing step.

71. The method of claim 68 wherein said detecting step actuates said stepping only after a delay sufficient for the detected seed to pass into its distributed substream.

72. A method for sowing seeds, comprising:

providing seeds from storage to each of a plurality of seed streams, detecting in each said seed stream each seed therein as it passes a predetermined location, cyclically distributing in stepwise fashion the detected seeds in each said seed stream into each of a series of substreams, the stepping from one substream to the next being actuated by the detecting step, each cycle ending at a home position, from which seeds distributed thereto are returned to storage instead of being distributed into a substream, sensing said home position in each cycle, dispensing each seed in each cycle and from each of said streams into a different receiving location in a seed receptor, said receiving locations being arranged in rows, translating said seed receptor forward one row at the completion of each of a given number of cycles, and upon completion of a series of said given number of cycles sufficient to fill all the rows of said seed receptor, translating said seed receptor away.

73. The method of claim 72 wherein said detecting step is performed photoelectrically by partial interruption of a light beam by each said seed.

74. The method of claim 73 wherein each said detecting step actuates said stepping only after a delay sufficient for each detected seed to pass into its substream.

75. The method of claim 74 wherein each said translating step is actuated by said home position sensing, after delay sufficient to enable all the seeds from the dispensing step to reach their respective said receiving location.

76. The method of claim 75 wherein said sensing step is performed photoelectrically.

* * * * *

UNITED STATES PATENT AND TRADEMARK OFFICE
CERTIFICATE OF CORRECTION

PATENT NO. : 4,141,390
DATED : February 27, 1979
INVENTOR(S) : Eugene W. Arnold, Gregory K. Brock, David G. Halley It is certified that error appears in the above-identified patent and that said Letters Patent are hereby corrected as shown below:

Column 1, line 29, "of soil" should read --or soil--.
Column 9, line 66, "elbow 92" should read --elbow 93--.
Column 18, line 16, "rows of said" should read --rows of seed--
Column 18, line 45, after "reaches" insert --said--.
Column 21, line 67, "previous" should read --air pervious--.
Column 23, line 13, "cycle-member" should read --cycle-number--.

Signed and Sealed this

Nineteenth Day of June 1979

[SEAL]

Attest:

RUTH C. MASON
Attesting Officer

DONALD W. BANNER
Commissioner of Patents and Trademarks